March 13, 1956  G. D. MYLANDER  2,738,208
SEAL
Filed March 17, 1952  2 Sheets-Sheet 1
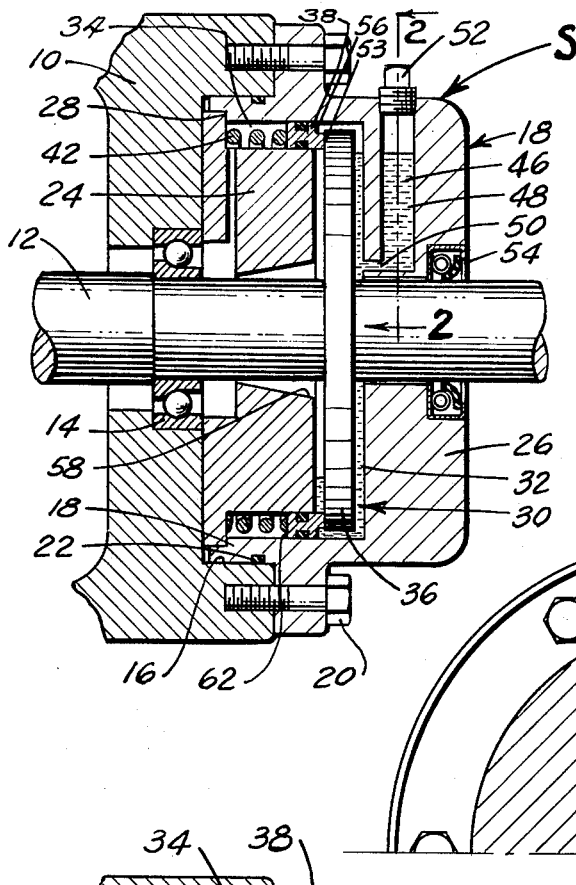
FIG. 1
FIG. 2
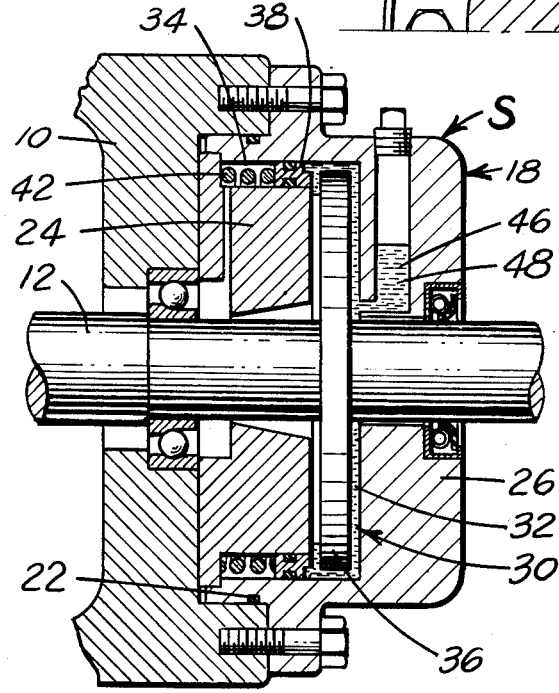
FIG. 3
INVENTOR.
GERALD D. MYLANDER
BY
Francis A. Utecht, Jr.
AGENT March 13, 1956  G. D. MYLANDER  2,738,208
SEAL Filed March 17, 1952  2 Sheets-Sheet 2

INVENTOR.
GERALD D. MYLANDER
BY
Francis A. Utecht, Jr.
AGENT

United States Patent Office 2,738,208
Patented Mar. 13, 1956

2,738,208

SEAL

Gerald D. Mylander, Huntington Park, Calif., assignor of thirty per cent to Francis A. Utecht, Jr., Long Beach, Calif.

Application March 17, 1952, Serial No. 277,023

6 Claims. (Cl. 286—9)

The present invention relates to seals for use between relatively rotatable stationary and rotatable members where a pressure differential exists between the opposite sides thereof.

There have been heretofore proposed a number of seals for this purpose, one type comprising rotating and stationary seal members held in frictional engagement under considerable pressure, and generally termed "mechanical seals." These mechanical seals function satisfactorily under most conditions, but because of their constant frictional engagement, wear quite rapidly and consume considerable power. Additionally, it is necessary to provide these mechanical seals with lubrication in order to obtain satisfactory operation and a reasonable service life. Under certain conditions, however, it will be impractical to provide lubrication of these seals; especially where the seal is utilized with a pump handling fluid which must not be contaminated.

In the past where such conditions existed, it has been proposed that a so-called "liquid seal" be utilized in lieu of a mechanical seal. These liquid seals do not require lubrication, and when used with a pump do not allow contamination of the pumped fluid. Unfortunately, however, these liquid seals are ordinarily limited to use with a pump having a vertical shaft, and only under conditions where a low pressure differential exists on opposite sides of the seal.

It is the major object of the present invention to provide a seal which incorporates the advantages of a mechanical seal, and also those of a liquid seal without the disadvantages thereof; the seal functioning as a mechanical seal while the members being sealed are relatively staionary, and as a liquid seal when said members are rotating relative to each other at normal operating speed.

It is another object of the invention to provide a seal of this nature which may be utilized with a stationary casing and a horizontal shaft rotatable relative thereto.

A further object of the invention is to provide a seal of this nature where the mechanical sealing elements are caused to disengage under the influence of centrifugal force built up within the seal by sealing liquid forming part of the seal.

Further objects and advantages of the present invention will be apparent from the following detailed description of two preferred embodiments thereof, taken in conjunction with the appended drawings, wherein:

Figure 1 is an axial section showing a preferred form of my seal as it may be arranged for use with a centrifugal pump, and showing the parts thereof as they appear when at rest.

Figure 2 is a fragmentary trans-axial sectional view taken on lines 2—2 of Figure 1.

Figure 3 is a view similar to Figure 1, but showing the parts as they appear when the shaft of the pump is rotating at operating speed.

Figure 4:
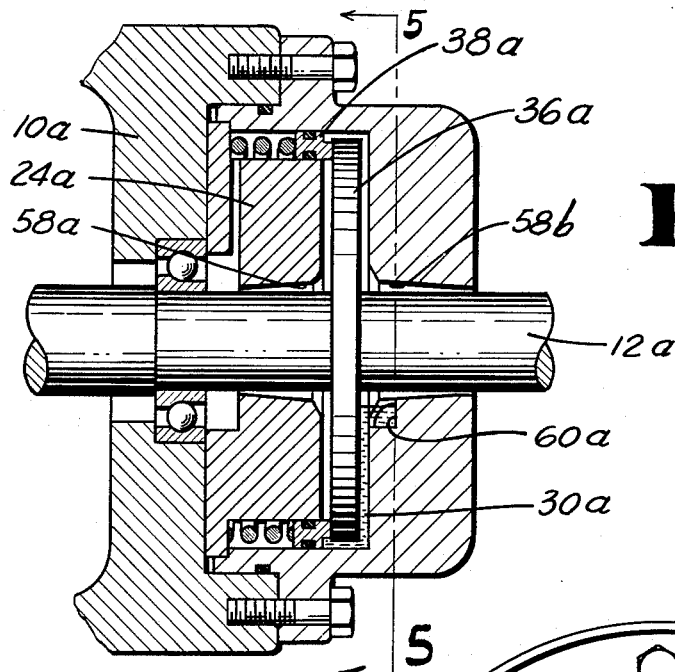
Figure 4 is a view similar to Figure 1 but showing another form of seal embodying the present invention.

Referring to the drawings, and particularly to Figure 1, thereof, a preferred form of seal S embodying the present invention is shown arranged for use with the casing 10 and shaft 12 of a centrifugal pump; the shaft 12 being carried by a bearing 14. The casing 10 is bored at 16 to receive the stationary member 18 of the seal S, which member 18 may be removably attached to the casing by a plurality of bolts 20. A seal 22 may be disposed between the member 18 and the casing bore 16.

The stationary member 18 includes an envelope element 24 which is retained between the rear of the body element 26 of this member 18 and the front of the casing 10 by means of the shoulder 28 formed at the rear of the body element. A chamber 30 is defined by the adjoining surfaces of body element 26 and envelope element 24. This chamber 30 includes an annular portion 32 concentric to and extending outwardly from the shaft 12 and also an axially extending portion 34 coinciding with and extending rearwardly from the radially outer end of the annular portion 32.

The shaft 12 rigidly mounts a flinger disk 36 adapted for rotation within the annular portion 32 of the chamber 30. A sealing ring 38 is disposed within the axially extending portion 34 of the chamber 30. This ring 38 is axially movable within this latter portion 36 towards and away from the rear surface of the disk 36. The sealing ring 38 is normally biased against the rear disk surface by spring means 42 disposed between the rear of the ring and the outer peripheral surface of the envelope element 24.

The chamber 30 is adapted to receive a heavy liquid, designated 46, such as mercury, which liquid acts as a sealing means between the casing 10 and the shaft 12 when the shaft is rotating at the normal operating speed of the pump. The stationary member 18 includes a vertically disposed reservoir 48 adapted to contain the heavy liquid 46 at such time as the shaft 12 is not rotating at its normal operating speed. The lower end of the reservoir 48 is in communication with the annular portion 32 of the chamber 30 by means of a passage 50. The upper end of the reservoir 48 receives a removable plug 52.

Referring to Figure 1 it will be observed that at such time as the shaft 12 is at rest the spring 42 acts to urge the face 53 of the sealing ring 38 into sealing engagement with the rear surface of the flinger disk 36. In this manner there will be effected a mechanical seal between the interior and exterior of the pump casing 10. At this time the heavy liquid 46 will likewise be restrained against movement into the pump casing by virtue of this sealing engagement. A low pressure seal 54 is shown disposed at the front portion of the stationary member 18 for the purpose of retaining the heavy liquid against outward leakage. This seal 54 may be any suitable conventional type capable of retaining the low amount of pressure generated by the head of the heavy liquid within the chamber 30 and the reservoir 48.

As the shaft 12 is set into rotation the flinger disk 36 will also commence rotating within the annular chamber portion 32. The clearance on either side of this disk should be comparatively small whereby such disk rotation may better serve to set the heavy liquid into rotative motion. Above a predetermined shaft speed the liquid 46 in front of the disk 36 will build up sufficient centrifugal force against the radially extending surface 56 of the ring 38 as to effect axial movement thereof away from the rear surface of the disk 36. When this occurs the liquid will assume different heights at opposite sides of the disk 36 under the influence of the pressure existing within the pump casing 10, as indicated in Figure 3. Referring to this figure, it will be apparent that the liquid 46 is serving as a liquid seal to restrain outward movement of the fluid contained within the pump casing 10.

At such time as it becomes desirable to stop the shaft 12, its speed of rotation will gradually diminish and finally cease. As the speed of the shaft diminishes the centrifugal force of the liquid 46 likewise diminishes whereby the pressure exerted by the liquid against the ring surface 56 falls below that necessary to overcome the combined forces of the spring 42 and pump fluid pressure against rear face 62 of the ring. At this point the ring will be urged forwardly under the influence of these forces until its sealing face 53 again sealingly engages the rear surface of the disk 36.

It will generally occur that at the time the sealing face 53 of the ring 38 contacts the disk 36, a small quantity of heavy liquid will be trapped radially inwardly of the ring to the rear of the disk. In order to insure that all, or substantially all, of this trapped liquid falls to the lower portion of the chamber 30, the portion of the envelope member 24 adjacent the shaft 12 is seen to be of frusto-conical configuration; the small end of this portion being positioned remotely from the rear of the disk 36. With this arrangement, any liquid falling from the upper portion of the chamber 30 which clings to the envelope member 24 will follow the tapered sides 58 thereof around the shaft and into the lower portion of the chamber. When the shaft 12 is again set into motion the liquid trapped in the lower chamber portion above the ring 38 will remain in the radially outer end of this portion until sufficient centrifugal force is generated by the liquid disposed forwardly of the disk 36 to effect axial displacement of the ring away from the disk. The formerly-trapped liquid will then rejoin the main body of liquid.

Figure 5:
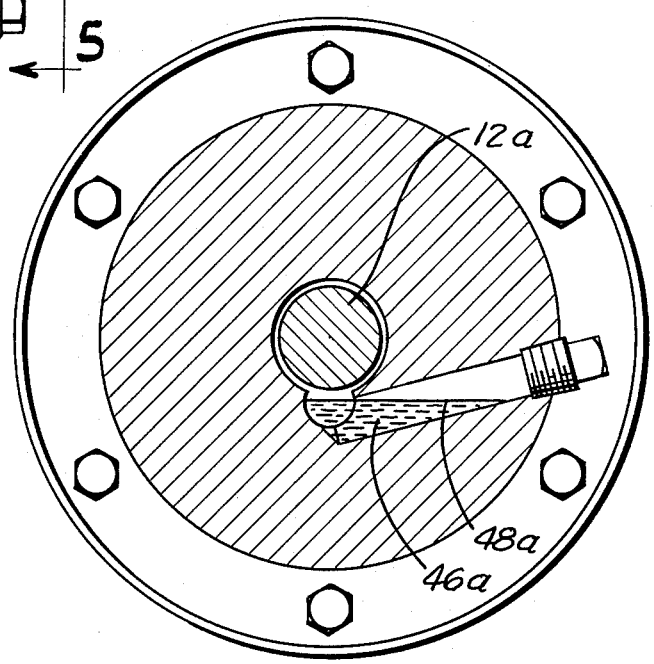
Figure 5 is a trans-axial sectional view taken on lines 5—5 of Figure 4.

Referring now to Figures 4 and 5, there is shown another form of seal embodying the present invention. It will be observed that this form of seal is substantially identical to the form shown in Figures 1, 2 and 3, except that the low pressure seal 54 has been eliminated. This is made possible by an arrangement wherein the heavy liquid reservoir 48a is disposed below the shaft 12a. The reservoir 48a is in communication with the chamber 30a by means of a recess 60 formed in the envelope member 24a at a point below below the shaft 12 and forward of the chamber. The envelope member 24a is also seen to be formed with a frusto-conical configuration at both sides of the disk 36a.

As indicated in Figure 5, at such time as the shaft 12a is not being rotated, the entire body of heavy liquid 46a may be contained within the lower part of the chamber 30a and the reservoir 48a. Upon rotation of the shaft this liquid will be urged radially outwardly by the disk 36a until sufficient centrifugal force is generated thereby to open the seal ring 38a. When the shaft is again brought to rest any liquid disposed in the upper portion of the chamber 30a will fall to the bottom thereof; such liquid following the tapered walls 58a and 58b of the envelope member 24a whereby it will be retained within the chamber. Inasmuch as the level of the liquid is located below the shaft 12a, no seal is required between the shaft and the exterior of the pump casing 10a.

It will be apparent to those skilled in the art that various modifications and changes may be made with respect to the aforedescribed embodiments without departing from the spirit of the invention or the scope of the following claims.

I claim:

1. A seal for a stationary member and a horizontal rotatable shaft extending through said member, comprising: a chamber formed in said member, said chamber including an annular portion extending radially outward from said shaft and concentric to said shaft and an axially extending portion concentric with said shaft and positioned radially outwardly therefrom; a flinger disk secured to said shaft for rotation within said annular portion of said chamber; a sealing ring disposed within said axially extending portion of said chamber for axial movement toward and away from a radially extending surface of said disk, said ring having a radial surface exposed to the radially outer portion of said annular portion of said chamber; means preventing the passage of liquid pressure around the outer periphery of said ring; spring means disposed between the rear of said sealing ring and said member normally biasing the front of said ring into sealing engagement with said disk, said chamber being adapted to receive a heavy liquid whereby upon rotation of said shaft above a predetermined speed said liquid may build up sufficient centrifugal force against said radial surface of said sealing ring as to effect axial movement of said ring away from said disk; and a reservoir for said liquid apart from said chamber above said shaft and in communication with said chamber.

2. A seal for a stationary member and a horizontal rotatable shaft extending through said member, comprising: a chamber formed in said member, said chamber including an annular portion extending radially outward from said shaft and concentric to said shaft and an axially extending portion concentric with said shaft and positioned radially outwardly therefrom; a flinger disk secured to said shaft for rotation within said annular portion of said chamber; a sealing ring disposed within said axially extending portion of said chamber for axial movement toward and away from a radially extending surface of said disk, said ring having a radial surface exposed to the radially outer portion of said annular portion of said chamber; means preventing the passage of liquid pressure around the outer periphery of said ring; and resilient means disposed between said sealing ring and said member normally biasing said ring into sealing engagement with said disk, said chamber being adapted to receive a heavy liquid whereby upon rotation of said shaft above a predetermined speed said liquid may build up sufficient centrifugal force against said radial surface of said sealing ring as to effect axial movement of said ring away from said disk, the portion of said member adjacent to said disk defining a frustro-conical envelope surrounding said shaft, the small end of said envelope being positioned remotely from said disk whereby any heavy liquid located above said shaft in said chamber when said shaft rotates below said predetermined speed may flow readily into the portion of said chamber below said shaft.

3. A seal for a stationary casing and a horizontal rotatable shaft extending through said casing, comprising: a stationary member securable to said casing wherein is formed a chamber including an annular portion concentric to and extending outwardly from said shaft, said chamber also including an axially extending portion coinciding with and extending rearwardly from the radially outer end of said annular portion; a flinger disk secured to said shaft for rotation within said annular portion of said chamber; a sealing ring disposed within said axially extending portion of said chamber for axial movement relative to the rear surface of said disk, said ring having a radially extending surface exposed to the radially outer end of said annular portion of said chamber; means preventing the passage of liquid pressure around the outer periphery of said ring; and spring means disposed between said stationary member and the rear of said sealing ring normally biasing the front of said ring into sealing engagement with the rear surface of said disk, said chamber being adapted to receive a heavy liquid whereby upon rotation of said shaft above a predetermined speed said liquid may build up sufficient centrifugal force in the radially outer end of said chamber against said radially extending surface of said sealing ring as to urge it rearwardly away from said disk at which point said heavy liquid will provide a liquid seal between said casing and said shaft.

4. A seal for a stationary member and a horizontal rotatable shaft extending through said member, comprising: a chamber formed in said member, said chamber including an annular portion extending radially outward from said shaft and concentric to said shaft and an axially extending portion concentric with said shaft and positioned radially outwardly therefrom; a flinger disk secured to said shaft for rotation within said annular portion of said chamber; a sealing ring disposed within said axially extending portion of said chamber for axial movement toward and away from a radially extending surface of said disk, said ring having a radial surface exposed to the radially outer portion of said annular portion of said chamber; means preventing the passage of liquid pressure around the outer periphery of said ring; spring means disposed between the rear of said sealing ring and said member normally biasing the front of said ring into sealing engagement with the rear surface of said disk, said chamber being adapted to receive a heavy liquid whereby upon rotation of said shaft above a predetermined speed said liquid may build up sufficient centrifugal force against said radial surface of said sealing ring as to effect axial movement of said ring away from said disk; a reservoir for said liquid apart from said chamber above said shaft and in communication with said chamber; and, a secondary seal between said shaft and said stationary member disposed between said chamber and the atmosphere.

5. A seal for a stationary member and a horizontal rotatable shaft extending through said member, comprising: a chamber formed in said member, said chamber including an annular portion extending radially outward from said shaft and concentric to said shaft and an axially extending portion concentric with said shaft and positioned radially outwardly therefrom; a flinger disk secured to said shaft for rotation within said annular portion of said chamber; a sealing ring disposed within said axially extending portion of said chamber for axial movement toward and away from a radially extending surface of said disk, said ring having a radial surface exposed to the radially outer portion of said annular portion of said chamber; spring means disposed between the rear of said sealing ring and said member normally biasing the front of said ring into sealing engagement with the rear surface of said disk, said chamber being adapted to receive a heavy liquid whereby upon rotation of said shaft above a predetermined speed said liquid may build up sufficient centrifugal force against said radial surface of said ring as to effect axial movement of said ring away from said disk; means preventing the passage of liquid pressure around the outer periphery of said ring; a reservoir for said liquid apart from said chamber above said shaft and in communication with said chamber; and the portion of said stationary member adjacent said disk defining a frustro-conical envelope surrounding said shaft with the small end of said envelope being positioned remotely from said disk whereby any heavy liquid located above said shaft when it rotates below said predetermined speed may flow readily into the portion of said chamber below said shaft.

6. A seal for a stationary member and a horizontal rotatable shaft extending through said member, comprising: a chamber formed in said member, said chamber including an annular portion extending radially outward from said shaft and concentric to said shaft and an axially extending portion concentric with said shaft and positioned radially outwardly therefrom; a flinger disk secured to said shaft for rotation within said annular portion of said chamber; a sealing ring disposed within said axially extending portion of said chamber for axial movement toward and away from a radially extending surface of said disk, said ring having a radial surface exposed to the radially outer portion of said annular portion of said chamber; spring means disposed between the rear of said sealing ring and said member normally biasing said ring into sealing engagement with said disk, said chamber being adapted to receive a heavy liquid whereby upon rotation of said shaft above a predetermined speed said liquid may build up sufficient centrifugal force against said radial surface of said ring as to effect axial movement of said ring away from said disk; means preventing the passage of liquid pressure around the outer periphery of said ring; a reservoir for said liquid apart from said chamber above said shaft and in communication with said chamber; and, a secondary seal between said shaft and said stationary member disposed between said chamber and the atmosphere, and, the portion of said stationary member adjacent said disk defining a frustro-conical envelope surrounding said shaft with the small end of said envelope being positioned remotely from said disk whereby any heavy liquid located above said shaft when it rotates below said predetermined speed may flow readily into the portion of said chamber below said shaft.

References Cited in the file of this patent

UNITED STATES PATENTS

| | | |
|---|---|---|
| 1,315,822 | Doran | Sept. 9, 1919 |
| 1,903,210 | Carrier | Mar. 28, 1933 |
| 1,932,214 | Hornschuch | Oct. 24, 1933 |
| 2,461,655 | Noble | Feb. 15, 1949 |
| 2,646,999 | Barske | July 28, 1953 |

FOREIGN PATENTS

| | | |
|---|---|---|
| 634,855 | Great Britain | Mar. 29, 1950 |
| 664,820 | Great Britain | Jan. 16, 1952 |